United States Patent [19]

Mizusawa et al.

[11] Patent Number: 4,548,445
[45] Date of Patent: Oct. 22, 1985

[54] DEVICE FOR CONTROLLING HYDRAULIC PRESSURE FOR BRAKING A VEHICLE

[75] Inventors: Mitutoyo Mizusawa; Masao Fujisawa, both of Ueda, Japan

[73] Assignee: Nissin Kogyo Kabushiki Kaisha, Nagano, Japan

[21] Appl. No.: 524,216

[22] Filed: Aug. 18, 1983

[30] Foreign Application Priority Data

Sep. 17, 1982 [JP] Japan .............................. 57-161622
Sep. 17, 1982 [JP] Japan .............................. 57-161623

[51] Int. Cl.⁴ ............................................. B60T 8/22
[52] U.S. Cl. ............................................... 303/22 A
[58] Field of Search ................. 303/6 C, 22 A, 22 R, 303/56

[56] References Cited

U.S. PATENT DOCUMENTS 3,501,203  3/1970  Falk ................................. 303/22 A
3,712,684  1/1973  Cordiano ........................ 303/22 A Primary Examiner—Duane A. Reger
Attorney, Agent, or Firm—Armstrong, Nikaido, Marmelstein & Kubovcik

[57] ABSTRACT

Disclosed is an improved device for controlling hydraulic pressure for braking a vehicle of the type including a pressure reducing valve disposed midway of an oil passage extending between an output port of a master cylinder and a rear wheel brake, said pressure reducing valve being adapted to proportionally reduce hydraulic pressure from the output port and then transmit reduced hydraulic pressure to the rear wheel brake. The improvement consists in that a pneumatic spring incorporated in a suspension system for determining hydraulic pressure at which the pressure reducing valve initiates pressure reducing function in dependence on the weight of cargoes loaded on the vehicle is operatively connected to a valve body of the pressure reducing valve in such a manner as to bias the valve body in the valve opening direction. Further, a mechanical spring is arranged for determining hydraulic pressure at which the pressure reducing valve initiates its pressure reducing function in the event that the pneumatic spring is in trouble. Alternatively, two pneumatic springs may be provided in such a manner that intended pressure reducing function can be assured by means of one of them when the other one fails to function properly.

5 Claims, 2 Drawing Figures

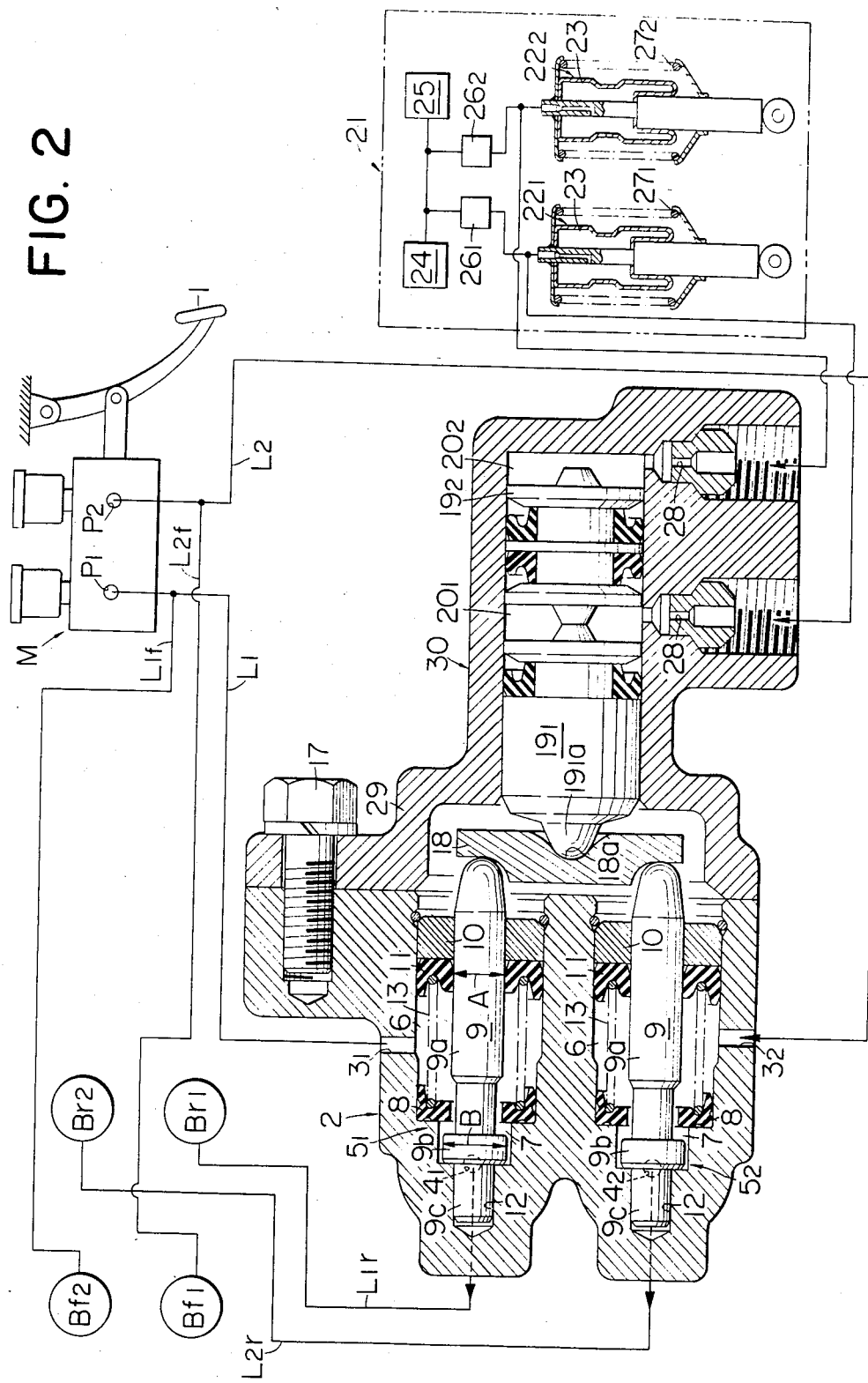

DEVICE FOR CONTROLLING HYDRAULIC PRESSURE FOR BRAKING A VEHICLE

BACKGROUND OF THE INVENTION

1. Field of the Invention

The present invention relates to a device for controlling hydraulic pressure for braking a vehicle and more particularly to an improved device for controlling hydraulic pressure for braking a vehicle of the type including a pressure reducing valve disposed midway of an oil passage extending between an output port of a master cylinder and a rear wheel brake, said pressure reducing valve being adapted to proportionally reduce hydraulic pressure fed from the output port and then transmit reduced hydraulic pressure to the rear wheel brake, so that an occurance of locking of rear wheels is inhibited, said locking being attributable to decrease of load exerted on the rear wheels when braking is effected.

2. Description of the Prior Art

When a vehicle is braked with the aid of a device of the above-mentioned type, there is necessity for changing hydraulic pressure at which a pressure reducing valve initiates pressure reducing function in dependence on the weight of cargoes loaded on the vehicle, for instance, determining hydraulic pressure at which the pressure reducing valve initiates its pressure reducing function when the vehicle is loaded with cargoes to be higher than that at a time when the vehicle is not loaded.

Since the conventional device is constructed so that hydraulic pressure at which the pressure reducing valve initiates pressure reducing function is determined by preset load of spring means, the aforesaid hydraulic pressure is always kept constant and therefore no possibility exists of changing such pressure in dependence on the weight of cargoes loaded on the vehicle.

Hence, the present invention has been made with the foregoing problems in mind and it is an object of the invention to provide an improved device for controlling hydraulic pressure for braking a vehicle of the type adapted to change hydraulic pressure at which a pressure reducing valve initiates pressure reducing function with the aid of a pneumatic spring as employed for a suspension system dependently on the weight of cargoes loaded on the vehicle.

It is other object of the invention to provide an improved device for controlling hydraulic pressure for braking a vehicle of the type which assures that the pressure reducing valve carries out pressure reduction with high operational safety even when a pneumatic system including a pneumatic spring fails to function properly.

To accomplish the above objects there is proposed in accordance with the present invention an improved device for controlling hydraulic pressure for braking a vehicle of the type including a pressure reducing valve disposed midway of an oil passage extending between an output port of a master cylinder and a rear wheel brake, said pressure reducing valve being adapted to proportionally reduce hydraulic pressure fed from said output port and then transmit reduced hydraulic pressure to the rear wheel brake, the improvement consisting in that a pneumatic spring incorporated in a suspension mechanism for determining hydraulic pressure at which the pressure reducing valve initiates pressure reducing function dependently on the weight of cargoes loaded on the vehicle is operatively connected to a valve body of the pressure reducing valve in such a manner as to bias said valve body in a valve opening direction.

In a preferred embodiment of the invention the device includes a mechanical spring which serves to determine hydraulic pressure at which the pressure reducing valve initiates pressure reducing function when the pneumatic spring fails to function properly, said mechanical spring being in operative connection to the valve body of the pressure reducing valve in such a manner as to displace it in the direction of valve opening.

In another preferred embodiment of the invention it is proposed that the pneumatic spring comprises a first pneumatic spring and a second pneumatic spring and the pressure reducing valve includes a cylinder additionally mounted thereon into which a free piston is slidably fitted to define a first pressure chamber and a second pressure chamber therein, said first and second pressure chambers being connected to the valve body of the pressure reducing valve as well as being communicated with said first and second pneumatic springs, respectively.

The arrangement of the device in the above-described manner makes it possible to appropriately determine hydraulic pressure at which the pressure reducing valve initiates its pressure reducing function in dependence on the weight of cargoes loaded on vehicle and therefore braking can be effected similarly to ideal braking.

In the first mentioned embodiment where the device includes a mechanical spring disposed therein, the spring determines hydraulic pressure at which the pressure reducing valve initiates its pressure reducing function when a pneumatic system including the pneumatic spring falls into trouble for some reason, thereby to reduce hydraulic pressure to be transmitted to the rear wheel brake. Thus, it is assured that occurance of locking of rear wheels is prevented, resulting in high operational safety.

Further, in the last mentioned embodiment the pressure reducing valve includes a cylinder additionally mounted thereon into which a piston is slidably fitted to define a first pressure chamber and a second pressure chamber therein, said first and second pressure chambers being connected to the valve body of the pressure reducing valve as well as being communicated with first and second pneumatic springs in a suspension system, respectively, which springs serve to displace the valve body in the valve opening direction thereby to determine hydraulic pressure at which the pressure reducing valve initiates its pressure reducing function dependently on the weight of cargoes loaded on vehicle, whereby pressure reduction is effected with the aid of either one of pneumatic systems including one pneumatic spring when the other system is in trouble. Thus, the same advantages as in the first mentioned embodiment are assured.

Above and other objects, features and advantages of the present invention will become more clearly apparent from reading of the following detailed description of some preferred embodiments in conjunction with the accompanying drawings.

BRIEF DESCRIPTION OF THE DRAWINGS

The accompanying drawings will be briefly described below.

FIG. 2 is a vertical sectional view of a device in accordance with the second embodiment of the invention.

DETAILED DESCRIPTION OF THE PREFERRED EMBODIMENTS

Figure 1:
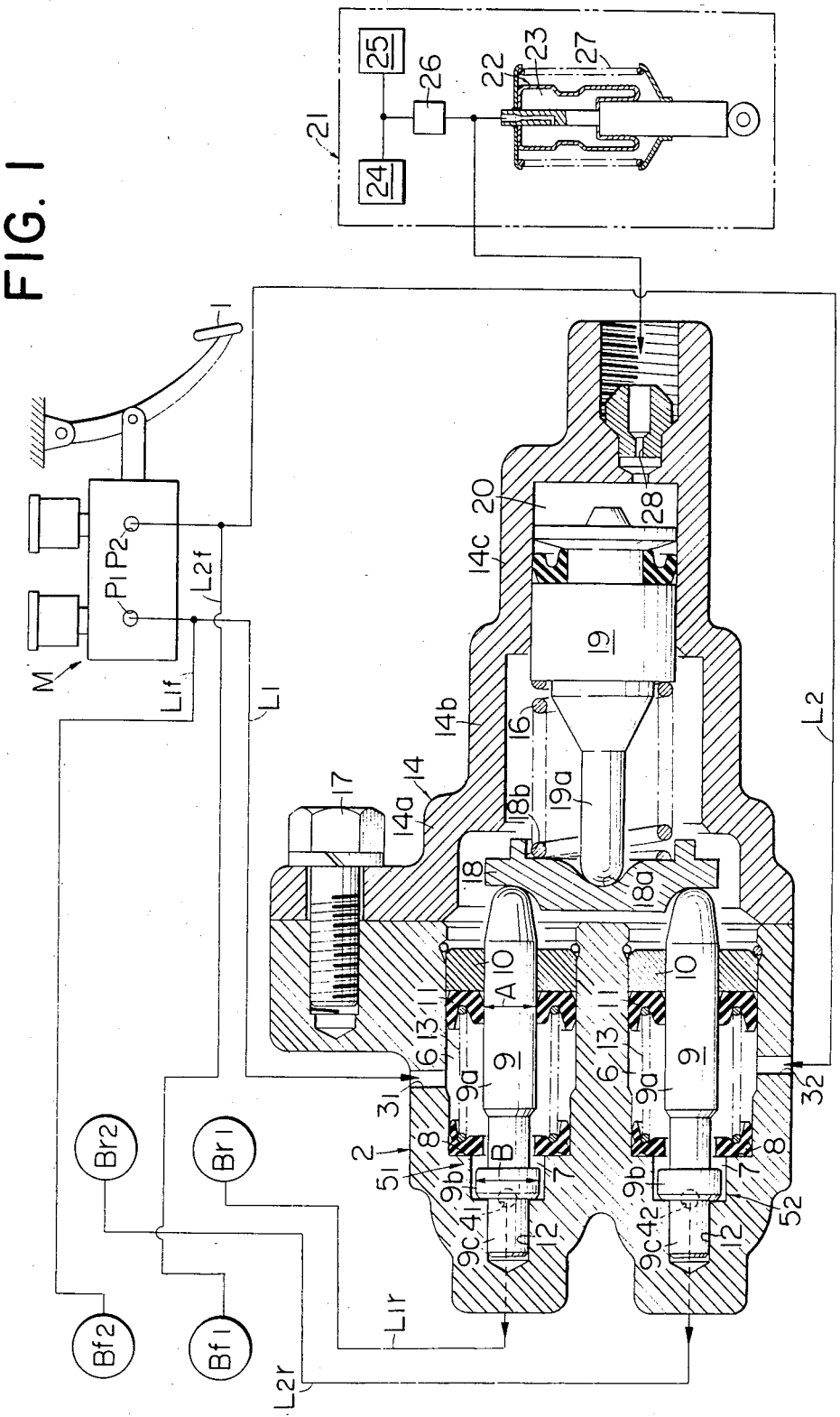
FIG. 1 is a vertical sectional view of a device in accordance with the first embodiment of the invention.

Now, the present invention will be described in a greater detail hereunder with reference to the accompanying drawings which illustrate two preferred embodiments of the invention, both being formed of a dual system type. It should be noted that same or similar corresponding parts or members in both the embodiments are represented by same reference numerals and letters.

First, description will be made as to the first embodiment of the invention as illustrated in FIG. 1.

Reference letter M designates a conventional tandem type master cylinder adapted to be actuated by means of a brake pedal 1, reference letter $B_{f1}$ does a lefthand front wheel brake, $B_{f2}$ a righthand front wheel brake, $B_{r1}$ a lefthand rear wheel brake and $B_{r2}$ a righthand rear wheel brake. Reference numeral 2 designates a valve casing fixedly mounted at a properly selected position on a chassis which is not shown in the drawing. In the valve casing 2 are provided a first inlet port $3_1$ communicating with a first output port $P_1$ of the master cylinder M via an oil passage $L_1$, a second inlet port $3_2$ communicating with a second output port $P_2$ of the master cylinder M via an oil passage $L_2$, a first outlet port $4_1$ communicating with the lefthand rear wheel brake $B_{r1}$ via an oil passage $L_{1r}$ and a second outlet port $4_2$ communicating with the righthand rear wheel brake $B_{r2}$ via an oil passage $L_{2r}$. Further, a first pressure reducing valve $5_1$ serving to control communication between the first inlet port $3_1$ and the first outlet port $4_1$ and a second pressure reducing valve $5_2$ serving to control communication between the second inlet port $3_2$ and the second outlet port $4_2$ are arranged in parallel to one another in the valve casing 2. The lefthand front wheel brake $B_{f1}$ is connected to the oil passage $L_2$ via a branch passage $L_{2f}$, whereas the righthand front brake $B_{f2}$ is connected to the oil passage $L_1$ via a branch passage $L_{1f}$.

The first pressure reducing valve $5_1$ comprises an input hydraulic chamber 6 in communication with the first inlet port $3_1$, an output hydraulic chamber 7 in communication with the first outlet port $4_1$, a resilient valve seat 8 made of rubber or the like material and disposed between both the hydraulic chambers 6 and 7, and a valve body 9 adapted to establish or interrupt communication between both the hydraulic chambers 6 and 7 in cooperation with the valve seat 8. Specifically, the valve body 9 includes a valve stem $9_a$ extending through a bore in the valve seat 8 and the input hydraulic chamber 6, a piston-shaped valve disc $9_b$ formed at the fore end of the valve stem $9_a$ and adapted to cooperate with the valve seat 8, and a guide rod portion $9_c$ projecting outward of the valve disc $9_b$, both of the valve disc $9_b$ and the guide rod portion $9_c$ being made integral with the valve stem $9_a$. The base portion of the valve stem $9_a$ is slidably supported by means of a bearing member 10 and an annular seal ring 11 is disposed adjacent to the bearing member 10 which constitutes one end wall of the input hydraulic chamber 6. Both the valve disc $9_b$ and the guide rod portion $9_c$ are located in the output hydraulic chamber 7 and the guide rod portion $9_c$ is slidably fitted into a smaller hole 12 of the output hydraulic chamber 7. Between the valve seat 8 and the seal ring 11 is disposed a coil spring 13 in a compressed state for holding the valve seat 8 and the seal ring 11 in abutment against the end walls of the input hydraulic chamber 6.

The second pressure reducing valve $5_2$ is identical in structure to the first pressure reducing valve $5_1$ with the exception that the input hydraulic pressure chamber 6 is communicated with the second inlet port $3_2$ and the output hydraulic chamber 7 is communicated with the second outlet port $4_2$. Therefore, parts and members corresponding to those in the first pressure reducing valve $5_1$ are identified with the same reference numerals.

Further, the valve casing 2 has a housing 14 fixedly attached thereto by means of bolts 17. The housing 14 comprises a lever receiving section $14_a$ having a larger diameter located adjacent to the input hydraulic chambers 6 of both the first and second pressure reducing valves $5_1$ and $5_2$, a coil spring receiving section $14_b$ having an intermediate diameter located outward of the lever receiving section $14_a$ and a cylinder section $14_c$ having a smaller diameter located further outward of the coil spring receiving section $14_b$. Specifically, the lever receiving section $14_a$ houses therein a disc-shaped balance lever 18 bridged between both the end parts of the valve stems $9_a$ of the pressure reducing valves $5_1$ and $5_2$. The cylinder section $14_c$ includes a piston 19 slidably fitted thereinto to define a pressure chamber 20 between the outer end surface of the piston 19 and the end wall surface of the cylinder section $14_c$. Further, the piston 19 has a projection $19_a$ projecting toward the lever receiving section $14_a$, the inner end part of the projection $19_a$ being formed semispherically to abut against a semispherical recess $18_a$ formed at the center of the balance lever 18. In the coil spring receiving section $14_b$ is arranged a coil spring 16 of which one end part is retained at an inside stepped portion $18_b$ of the balance lever 18 and of which other end part is retained at the outside stepped portion of the piston 19 whereby the coil spring 16 is compressed between the balance lever 18 and the piston 19 under predetermined load.

The pressure chamber 20 is in operative connection to a pneumatic chamber 23 of a pneumatic spring 23 constituting a pneumatic spring type chassis height adjusting mechanism 21 incorporated in a suspension system. Specifically, the chassis height adjusting mechanism 21 includes an air compressor 24, an accumulator 25 in which compressed air is accumulated, a pneumatic spring 22, a control valve 26 adapted to control introduction of compressed air from the accumulator 25 into the pneumatic spring 22 and discharge of the same from the spring 22, and a coil spring 27. The coil spring 27 serves for carrying the weight of vehicle when it is not loaded, whereas the pneumatic spring 22 does for carrying the weight of cargoes to be loaded thereon. Compressed air is introduced into the pneumatic chamber 23 of the pneumatic spring 22 dependently on the weight of loaded cargoes under control of the control valve 26 whereby the height of chassis is maintained constant. Accordingly, when cargoes loaded on vehicle are heavy, the pneumatic chamber 23 is filled with compressed air of higher pressure, whereas when they are light, the chamber 23 is filled with compressed air of lower pressure.

Thus, the pressure chamber 20 in the cylinder section $14_c$ is exposed to the same pressure as that in the pneumatic chamber 23 in the pneumatic spring 22, i.e., pneumatic pressure corresponding to the weight of loaded cargoes with the exception of the case where vehicle is not loaded with cargoes, whereby the piston 19 is caused to move in the leftward direction as seen in the drawing against resilient force of the coil spring 16. Since the semispherical end part of the projection $19_a$ abuts against the semispherical recess $18_a$ on the balance lever 18 so as to displace both the valve bodies 9 in the same direction, i.e., in the leftward direction as seen in the drawing, the valve disc $9_b$ of each of the valve bodies 9 is kept away from the valve seat 8 as the piston 19 moves in the leftward direction. Reference numeral 28 designates an orifice formed on the outer end wall of the cylinder section $14_c$. The orifice 28 is effective in damping pulsation of pressure in the pneumatic spring 22 so that pneumatic pressure in the pressure chamber 20 of the cylinder section $14_c$ is inhibited from changing abruptly.

Next, operation of the device constructed in accordance with the first embodiment will be described below.

When the master cylinder M is actuated by depressing the brake pedal 1 with a driver's foot during travelling of vehicle, hydraulic pressure is outputted from both the first and second output ports $P_1$ and $P_2$ of the master cylinder M. Hydraulic pressure from the first output port $P_1$ is transmitted to the righthand front wheel brake $B_{f2}$ via the oil passages $L_1$ and $L_{1f}$ as well as to the lefthand rear wheel brake $B_{r1}$ via the input hydraulic chamber 6 in the first pressure reducing valve $5_1$, the output hydraulic chamber 7 and the oil passage $L_{1r}$ so that both the righthand front wheel brake $B_{f2}$ and the lefthand rear wheel brake $B_{r1}$ are actuated. On the other hand, hydraulic pressure from the second output port $P_2$ is transmitted to the lefthand front wheel brake $B_{f1}$ via the oil passages $L_2$ and $L_{2f}$ as well as to the righthand rear wheel brake $B_{r2}$ via the input hydraulic chamber 6 in the second pressure reducing valve $5_2$, the output hydraulic chamber 7 and the oil passage $L_{2r}$ so that both the lefthand front wheel brake $B_{f1}$ and the righthand rear rear wheel brake $B_{r2}$ are actuated.

When hydraulic pressure at the first and second output ports $P_1$ and $P_2$ of the master cylinder M is increased in excess of a predetermined level, the first and second pressure reducing valves $5_1$ and $5_2$ are initiated to control working pressure for the rear wheel brakes $B_{r1}$ and $B_{r2}$. Now, control operation of the first and second pressure reducing valves $5_1$ and $5_2$ will be described in more detail.

When hydraulic pressure in the input hydraulic pressure chamber 6 and the output hydraulic pressure chamber 7 of the first pressure reducing valve $5_1$ reaches a predetermined level due to increase in hydraulic pressure outputted from the first output port $P_1$, thrusting force exerted on the valve body 9 in the rightward direction as seen in the drawing (equal to force obtained from cross-sectional area A at the fore end of the valve stem $9_a$ multiplied by hydraulic pressure in the input and output hydraulic pressure chambers 6 and 7) overcomes offset force active on the valve body 9 due to air pressure which is introduced into the pressure chamber 20 of the cylinder section $14_c$, i.e., air pressure in the pneumatic spring 22. As a result the valve body 9 is caused to move in the rightward direction as seen in the drawing until the valve disc $9_b$ abuts against the valve seat 8 to interrupt communication between both the input and output hydraulic pressure chambers 6, 7. When hydraulic pressure from the first output port $P_1$ is increased further, leftward thrusting force on the valve body 9 caused by hydraulic pressure in the input hydraulic pressure chamber 6 (substantially equal to force obtained by differential area between cross-sectional area B of the valve disc $9_b$ and cross-sectional area A of the valve body 9 multiplied by hydraulic pressure in the input hydraulic pressure chamber 6) overcomes rightward thrusting force on the valve body 9 caused by hydraulic pressure in the output hydraulic pressure chamber 7 (substantially equal to force obtained from cross-sectional area B of the valve disc $9_b$ multiplied by hydraulic pressure in the output hydraulic pressure chamber 7). As a result the valve body 9 is caused to move back in the leftward direction to part the valve disc $9_b$ away from the valve seat 8 so that communication between both the hydraulic pressure chambers 6 and 7 is established again, resulting in that increased hydraulic pressure develops in the output hydraulic pressure chamber 7. Then, rightward thrusting force on the valve body 9 caused by hydraulic pressure in the output hydraulic pressure chamber 7 is immediately increased to cause the valve body 9 to move in the rightward direction again until communication between both the hydraulic pressure chambers 6 and 7 is interrupted. Thus, the same operations are repeated in accordance with increase in hydraulic pressure fed from the first output port $P_1$ and as a result hydraulic pressure from the first output port $P_1$ can be transmitted to the lefthand rear wheel brake $B_{r1}$ at a proportionally reduced level.

Since pressure at which the pressure reducing valve $5_1$ initiates pressure reducing function is determined by cross-sectional area A of the valve body 9 and pressure in the pneumatic chamber 23 of the pneumatic spring 22 while pressure in the pneumatic chamber 23 varies in dependence on the weight of cargoes loaded on vehicle, braking is effected similarly to ideal braking. Further, the ratio of pressure reduction is determined substantially by the ratio of differential cross-sectional area (B-A) to cross-sectional area A.

On the other hand, when hydraulic pressure from the second output port $P_2$ is increased in excess of a predetermined level, the second pressure reducing valve $5_2$ operates in the same manner as the first pressure reducing valve $5_1$ so that the hydraulic pressure is similarly transmitted to the righthand rear wheel brake $B_{r2}$ at a proportionally reduced level.

As will be readily apparent, there is usually produced an appreciable extent of difference in timing of initiation of operation of the respective valve bodies 9 and in their working strokes when both the pressure reducing valves $5_1$ and $5_2$ are caused to operate. As the balance lever 13 inclines about the semispherical end part $19_a$ of the piston 19 dependently on the extent of such difference as mentioned above, working force developed by pneumatic pressure in the pressure chamber 20 of the cylinder section $14_c$ is always distributed equally to both the valve bodies 9. As a result, pressure at which both the pressure reducing valves $5_1$ and $5_2$ initiate pressure reducing function can be kept well balanced.

If there takes place any trouble such as air leakage or the like in the pneumatic system including the pneumatic spring 22 for some reason, pressure disappears from the pressure chamber 20 of the cylinder section $14_c$ and therefore the piston 19 moves in the rightward direction under the influence of resilient force imparted by the coil spring 16 until it abuts against the end wall surface of the pressure chamber 20. At this moment both the valve bodies 9 of the pressure reducing valves $5_1$ and $5_2$ move in the leftward direction also under the influence of resilient force of the coil spring 16 and therefore each of the valve discs $9_b$ is held at a position spaced from the valve seat 8. When hydraulic pressure in the output hydraulic pressure chamber 7 reaches a predetermined level at the time of braking operation, thrusting force exerted on the valve bodies 9 in the rightward direction as seen in the drawing overcomes a half of preset load of the coil spring 16 so that the valve bodies 9 move in the rightward direction as seen in the drawing until the respective valve discs $9_b$ abut against the corresponding valve seats 8. Thus, hydraulic pressure fed from the first and second output ports $P_1$ and $P_2$ can be transmitted to the lefthand and righthand rear wheel brakes $B_{r1}$ and $B_{r2}$ in an appropriately reduced manner. In this case, preset load of the coil spring 16 is determined at a lower level so that operation of pressure reduction is initiated at lower pressure. In spite of this fact, however, an occurance of locking phenomenon can be inhibited with respect to the rear wheels without fail, resulting in safe braking activity assured for vehicle.

Next, description will be made as to the second embodiment of the invention with reference to FIG. 2.

A first pressure reducing valve $5_1$ is disposed midway of an oil passage extending between a first output port $P_1$ of a master cylinder M and a lefthand rear wheel brake $B_{r1}$, whereas a second pressure reducing valve $5_2$ is disposed midway of an oil passage extending between a second output port $P_2$ of the master cylinder M and a righthand rear wheel brake $B_{r2}$ in the same manner as in the foregoing embodiment. A cylinder 30 including a lever receiving section 29 is disposed adjacent to the input hydraulic pressure chambers 6 of both the first and second pressure reducing valves $5_1$ and $5_2$ and is fixedly attached to the valve casing 2 by means of bolts 17.

Two valve stems $9_a$ of both the pressure reducing valves $5_1$ and $5_2$ projected into the lever receiving section 29 and a balance lever 18 is bridged between both the right end parts of the valve stems $9_a$ in the lever receiving section. Further, the cylinder 30 includes a first piston $19_1$ and a second piston $19_2$, the latter serving as a free piston. These first and second pistons $19_1$ and $19_2$ are located in series one after another in the cylinder 30, so that a first pressure chamber $20_1$ is defined in the space between the first piston $19_1$ and the second piston $19_2$ and a second pressure chamber $20_2$ is defined in the space between the second piston $19_2$ and the end wall of the cylinder 30. The first piston $19_1$ is formed with a semispherical projection $19_{1a}$ at the center of the fore end part thereof, said semispherical projection $19_{1a}$ being located opposite to a corresponding semispherical recess $18_a$ formed at the center of the balance lever 18.

The first pressure chamber $20_1$ is operatively connected to a pneumatic chamber 23 in a first pneumatic spring $22_1$ and the second pressure chamber $20_2$ is operatively connected to a pneumatic chamber 23 in a second pneumatic spring $22_2$. Both of the first and second pneumatic springs $22_1$ and $22_2$ constitute a pneumatic spring type chassis height adjusting mechanism 21 in a suspension system. Specifically, the chassis height adjusting mechanism 21 includes a compressor 24, an accumulator 25 in which compressed air is accumulated, the first pneumatic spring $22_1$, the second pneumatic spring $22_2$, a first control valve $26_1$ adapted to control introduction of compressed air from the accumulator 25 into the pneumatic chamber 23 of the first pneumatic spring $22_1$ and discharge of the same from the latter, a second control valve $26_2$ adapted to control introduction of compressed air from the accumulator 25 into the pneumatic chamber 23 in the second pneumatic spring $22_2$ and discharge of the same from the latter, a first coil spring $27_1$ for the first pneumatic spring $22_1$, and a second coil spring $27_2$ for the second pneumatic spring $22_2$. Both the first and second coil springs $27_1$ and $27_2$ serves for carrying the weight of vehicle when it is not loaded with cargoes, whereas both the first and second pneumatic springs $22_1$ and $22_2$ do for carrying the weight of any loaded cargoes. Compressed air is introduced into each of the pneumatic chambers 23 of the first and second pneumatic springs $22_1$ and $22_2$ dependently on the weight of loaded cargoes under control of the first and second control valves $26_1$ and $26_2$, respectively, whereby the height of chassis is maintained constant. Accordingly, when cargoes loaded on vehicle are heavy, each of the pneumatic chambers 23, 23 is filled with compressed air of higher pressure, whereas when they are light, the chamber 23 is filled with compressed air of lower pressure.

Thus, both the first and second pressure chambers $20_1$ and $20_2$ in the cylinder 30 are exposed to the same pressures as those in the pneumatic chambers 23 of both the first and second pneumatic springs $22_1$ and $22_2$, i.e., pneumatic pressure corresponding to the weight of loaded cargoes with the exception of the case where vehicle is not loaded with cargoes, so that the first and second pistons $19_1$ and $19_2$ are caused to move leftward in the drawing while they are brought in abutment against one another. Since the semispherical end part of the projection $19_{1a}$ of the first piston $19_1$ is fitted into the semispherical recess $18_a$ on the balance lever 18 thereby to displace both the valve bodies 9 in the same direction, i.e., in the leftward direction in the drawing, the valve disc $9_b$ of each of the valve bodies 9 is kept away from the valve seat 8 as both the pistons $19_1$ and $19_2$ move in the leftward direction.

Next, operation of the device constructed in accordance with the second embodiment will be described below.

As braking operation is initiated, hydraulic pressure from the first output port $P_1$ is increased until hydraulic pressure in the input hydraulic pressure chamber 6 and the output hydraulic pressure chamber 7 of the first pressure reducing valve $5_1$ reaches a predetermined level. Then, the thrusting force exerted on the valve body 9 in the rightward direction as seen in the drawing (equal to force obtained from cross-sectional area A at the fore end of the valve stem $9_a$ multiplied by hydraulic pressure in the input and output hydraulic pressure chambers 6 and 7) overcomes offset force active on the valve body 9 due to air pressure which is introduced into the first and second pressure chambers $20_1$ and $20_2$, i.e., air pressure in the pneumatic chambers 23, 23 of the first and second pneumatic springs $22_1$ and $22_2$. As a result, the valve body 9 is caused to move in the rightward direction in the drawing until the valve disc $9_b$ abuts against the valve seat 8 to interrupt communication between both the input and output hydraulic chambers 6 and 7. If air pressure in the pneumatic chambers of the first and second pneumatic springs $22_1$ and $22_2$ is kept at the same level, the aforesaid offset force is determined in dependence on air pressure in the second pressure chamber $20_2$ with both the first and second pistons $19_1$ and $19_2$ being brought in abutment against one another, whereas if air pressure in the pneumatic chamber of one of the first and second pneumatic chambers $22_1$ and $22_2$ is higher than that in the other one, the aforesaid offset force is determined in dependence on air pressure in said one pneumatic chamber which is filled with compressed air of higher pressure. When hydraulic pressure from the first output port $P_1$ is increased further, the valve disc $9_b$ of the valve body 9 is caused to move away from the valve seat 8 and then move toward the latter in the same manner as in the first embodiment. Thereafter, the above-mentioned movements of the valve body 9 are repeated. In consequence, hydraulic pressure fed from the first output port $P_1$ can be transmitted to the lefthand rear wheel brake $B_{r1}$ in a proportionally reduced manner.

Since pressure at which the first pressure reducing valve $5_1$ initiates its pressure reducing function is determined by cross-sectional area A and pressure in the pneumatic chambers of the first and second pneumatic springs $22_1$ and $22_2$ and moreover pressure in the pneumatic chambers varies in dependence on the weight of cargoes loaded on vehicle, it is assured that braking is effected similarly to ideal braking. Further, the ratio of pressure reduction is determined substantially by the ratio of differential cross-sectional area (B-A) to cross-sectional area A.

On the other hand, when hydraulic pressure fed from the second output port $P_2$ is increased in excess of a predetermined level, the second pressure reducing valve $5_2$ operates in the same manner as the first pressure reducing valve $5_1$ so that the hydraulic pressure can be transmitted to the righthand rear wheel brake $B_{r2}$ at a proportionally reduced level.

As will be readily apparent, there is usually produced an appreciable extent of difference in timing of initiation of operation of the respective valve bodies 9 and their working strokes when both the pressure reducing valves $5_1$ and $5_2$ are caused to operate. As the balance lever 18 inclines about the semispherical end part of the projection $19_{1a}$ of the first piston $19_1$ dependently on the extent of such difference as mentioned above, working force developed by pneumatic pressure in the first and second pressure chambers $20_1$ and $20_2$ of the cylinder 30 can be always distributed equally to both the valve bodies 9. Accordingly, pressure at which both the pressure reducing valves $5_1$ and $5_2$ initiate their pressure reducing operations can be kept well balanced.

The above description has been made with respect to the case where no trouble takes place with the first and second pneumatic springs $22_1$ and $22_2$. Assuming that a pneumatic system including the first pneumatic spring $22_1$ falls into trouble for some reason, air pressure in the pneumatic chamber 23 of the second pneumatic spring $22_2$ is introduced into the second pressure chamber $20_2$ so that pressure reducing operation can be performed in the same manner as described above. Alternatively, when another pneumatic system including the second pneumatic spring $22_2$ fails to function properly, pressure reducing operation can also be performed in the same manner.

In the illustrated second embodiment, no coil spring is arranged between the balance lever 18 and the first piston $19_1$. In view of a case when both the pneumatic systems are troubled for any reason, however, it will be obvious that a coil spring may be arranged between the balance lever 18 and the first piston $19_1$ in a compressed state in the same manner as in the first embodiment as illustrated in FIG. 1.

While the present invention has been particularly shown and described only with reference to two preferred embodiments thereof, it will be understood by those skilled in the art that the foregoing and other changes in form and details can be made therein without departing from the spirit and scope of the invention.

What is claimed is:

1. In an improved device for controlling hydraulic pressure for braking a vehicle of the type including a pressure reducing valve disposed midway of an oil passage extending between an output port of a master cylinder and a rear wheel brake, said pressure reducing valve being adapted to proportionally reduce hydraulic pressure fed from the output port and then transmit reduced hydraulic pressure to the rear wheel brake, the improvement comprising a pneumatic spring incorporated in a suspension system for determining hydraulic pressure at which said pressure reducing valve initiates its pressure reducing function dependently on the weight of cargo loaded on the vehicle, said pneumatic spring being operatively connected to a valve body of said pressure reducing valve in such a manner as to bias said valve body in a valve opening direction and a mechanical spring externally positioned of the valve body and operatively connected to said valve body so as to bias the latter in a valve opening direction and serving to determine hydraulic pressure at which the pressure reducing valve initiates its pressure reducing function when the pneumatic spring falls into trouble.

2. A device as defined in claim 1, wherein said output port of the master cylinder comprises a first output port and a second output port, the rear wheel brake comprises a lefthand rear wheel brake and a righthand rear wheel brake, the oil passage extending between the master cylinder and the rear wheel brake comprises a first oil passage connecting between said first output port and said lefthand rear wheel brake and a second oil passage connecting between said second output port and said righthand rear wheel brake, and the pressure reducing valve comprises a first pressure reducing valve disposed midway of said first oil passage and a second pressure reducing valve disposed midway of said second oil passage.

3. A device as defined in claim 1, wherein the pressure reducing valve includes a cylinder additionally mounted thereon into which cylinder a piston is slidably fitted to define a pressure chamber communicated with said pneumatic spring, said piston being operatively connected to said pressure reducing valve, and said mechanical spring is arranged between the pressure reducing valve and the piston.

4. A device as defined in claim 3, wherein the pressure chamber in the cylinder is filled with compressed air of the same pressure as in the pneumatic chamber of the pneumatic spring.

5. In an improved device for controlling hydraulic pressure for braking a vehicle of the type including a pressure reducing valve disposed midway of an oil passage extending between an output port of a master cylinder and a rear wheel brake, said pressure reducing valve including a valve body and being adapted to proportionally reduce hydraulic pressure fed from the output port and then transmit reduced hydraulic pressure to the rear wheel brake, the improvement wherein said device further comprises:

a first pneumatic spring having a pneumatic chamber, a second pneumatic spring having a pneumatic chamber, said first and second pneumatic springs being incorporated on a suspension system for determining hydraulic pressure at which said pressure reducing valve initiates its pressure reducing function dependently on the weight of cargo loaded on the vehicle, said pneumatic springs being operatively connected to said valve body of said pressure reducing valve in such a manner as to bias said valve body in a valve opening direction; and wherein said pressure reducing valve further includes a cylinder mounted thereon, a free piston slideably fitted in said cylinder defining a first pressure chamber and a second pressure chamber therein, said first and second pressure chambers being in communication with and filled with compressed air of the same pressures as in said first and second pneumatic chambers of said first and second pneumatic springs, respectively, and another piston slideably fitted in said cylinder independently of said free piston in series with said free piston, said first pressure chamber being defined between said free piston and said another piston, said second pressure chamber being defined between said free piston and an end wall of said cylinder, said another piston having a cross-sectional diameter equal to a cross-sectional diameter of said free piston, said free piston being operatively associated with said valve body through said another piston.

* * * * *